United States Patent
Breuer et al.

(10) Patent No.: US 9,614,640 B2
(45) Date of Patent: Apr. 4, 2017

(54) METHOD, DEVICE AND SYSTEM FOR DETECTING A JAMMING TRANSMITTER

(71) Applicant: Gemalto M2M GmbH, Munich (DE)

(72) Inventors: Volker Breuer, Botzow (DE); Lars Wehmeier, Falkensee (DE); Bernd Rohl, Berlin (DE)

(73) Assignee: GEMALTO M2M GMBH, Munich (DE)

( * ) Notice: Subject to any disclaimer, the term of this patent is extended or adjusted under 35 U.S.C. 154(b) by 48 days.

(21) Appl. No.: 14/436,015

(22) PCT Filed: Nov. 18, 2013

(86) PCT No.: PCT/EP2013/074086
§ 371 (c)(1),
(2) Date: Apr. 15, 2015

(87) PCT Pub. No.: WO2014/076283
PCT Pub. Date: May 22, 2014

(65) Prior Publication Data
US 2015/0270922 A1    Sep. 24, 2015

(30) Foreign Application Priority Data

Nov. 19, 2012  (EP) ..................... 12193182

(51) Int. Cl.
*H04K 3/00* (2006.01)
*H04B 1/10* (2006.01)

(52) U.S. Cl.
CPC ........... *H04K 3/222* (2013.01); *H04B 1/1027* (2013.01); *H04K 3/22* (2013.01); *H04K 3/43* (2013.01); *H04K 2203/16* (2013.01)

(58) Field of Classification Search
CPC .... H04B 1/1027; H04K 2203/16; H04K 3/22; H04K 3/222; H04K 3/43
See application file for complete search history.

(56) References Cited

U.S. PATENT DOCUMENTS

| | | |
|---|---|---|
| 6,229,998 B1 | 5/2001 | Hamdy et al. |
| 2007/0224963 A1 | 9/2007 | Moscovitz et al. |

(Continued)

FOREIGN PATENT DOCUMENTS

| | | |
|---|---|---|
| WO | WO 00/62437 A1 | 10/2000 |
| WO | WO 2005/112321 A1 | 11/2005 |

(Continued)

OTHER PUBLICATIONS

International Search Report (PCT/ISA/210) mailed on Feb. 4, 2014, by the European Patent Office as the International Searching Authority for International Application No. PCT/EP2013/074086.

(Continued)

*Primary Examiner* — Kashif Siddiqui
(74) *Attorney, Agent, or Firm* — Buchanan Ingersoll Rooney PC

(57) ABSTRACT

A base station in a cellular radio network and user equipment assigned to a cell are linked by an air interface for communication on a respective communication channel in a communication band. The same communication band is common to at least one of the cells and to the user equipment on the respective communication channel of a cell. A jamming transmitter is detected by decoding a cell, by way of successful reading of control information of the cell, detecting a wideband power parameter representative of the communication band, and detecting a channel power parameter representative for a part of the communication band that is a communication channel. A narrowband jamming transmitter is indicated in the case that decoding of the cell failed, the wideband power parameter is not above a first threshold, and the channel power parameter is above a second threshold.

17 Claims, 5 Drawing Sheets

(56) References Cited

U.S. PATENT DOCUMENTS

Figure 1:
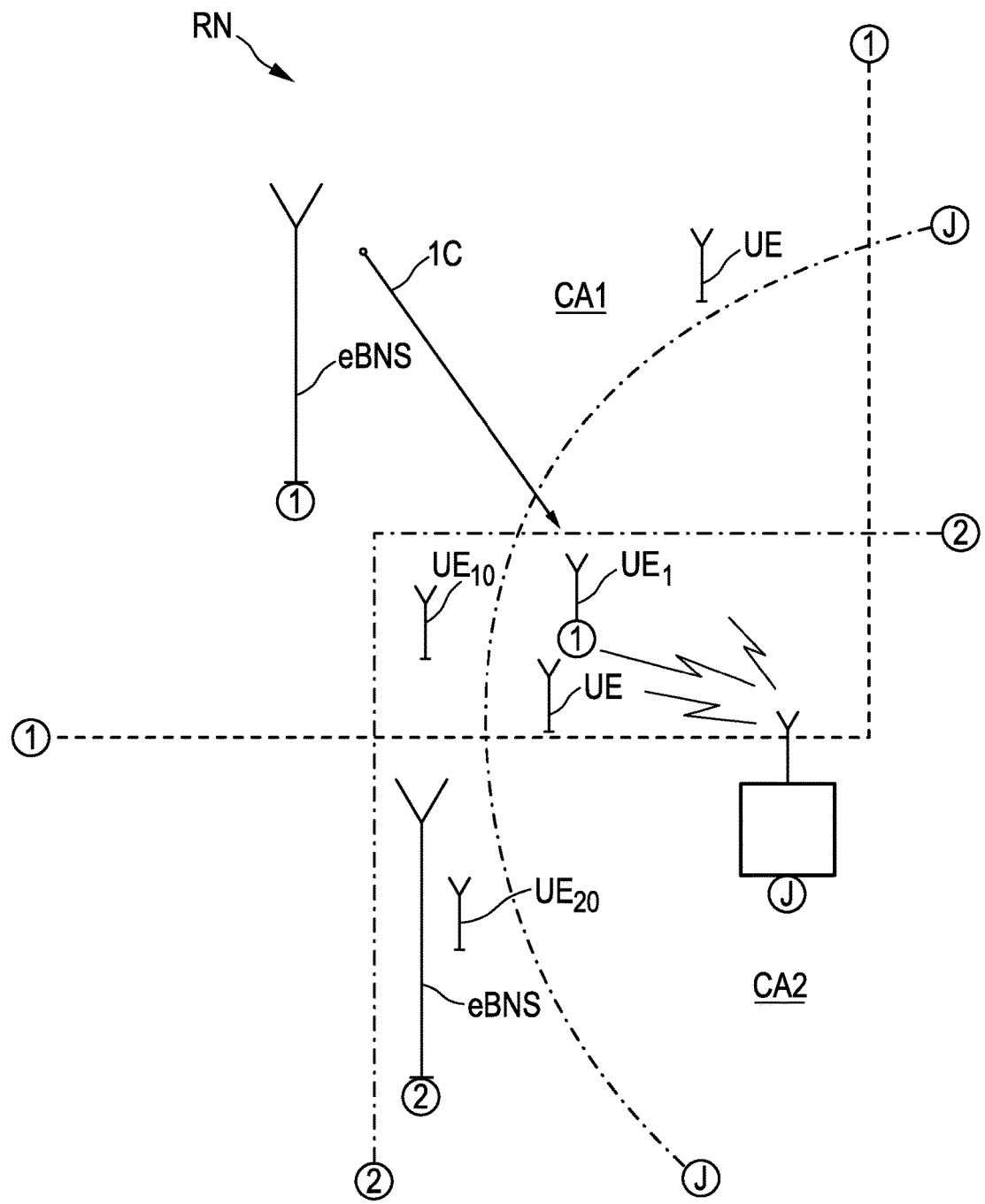

2012/0275492 A1* 11/2012 Jagger .................. H04B 1/1036
375/148
2012/0276897 A1 11/2012 Kwon et al.
2013/0122843 A1 5/2013 Sakai
2013/0215786 A1* 8/2013 Breuer ................. H04B 1/7097
370/252

FOREIGN PATENT DOCUMENTS

| WO | WO 2007/019814 A1 | 2/2007 |
| WO | WO 2011/148779 A1 | 12/2011 |
| WO | WO 2012/066052 A1 | 5/2012 |

OTHER PUBLICATIONS

Written Opinion (PCT/ISA/237) mailed on Feb. 4, 2014, by the European Patent Office as the International Searching Authority for International Application No. PCT/EP2013/074086.

* cited by examiner

METHOD, DEVICE AND SYSTEM FOR DETECTING A JAMMING TRANSMITTER

The invention relates to a method of detecting a jamming transmitter affecting a communication user equipment wherein said communication user equipment is adapted for communication with a component of a cellular radio network in a number of cells. The base station of a cell and a number of communication user equipments assigned to the cell can be linked by an air interface for the communication on a respective communication channel in a communication band of predetermined frequency range. The same communication band is common to at least one of the number of cells and to the number of communication user equipments on the respective communication channel of a cell.

The cellular radio network mentioned in the introduction preferably is of a 4G technology kind, namely contemporarily known under a cellular radio network according to the long term evolution technology (LTE or LTE-advanced; long term evolution) which has specific advantages for increasing transmission rates, in particular increasing the so called spectral efficiency, in downlink and uplink transmission rates.

Most importantly LTE provides a shared medium wherein the user shares a cell of the network with other users. Said cellular radio network is preferably adapted for coding communication signals in a link related to the communication user equipment by means of an orthogonal division multiple access (ODMA) and being adapted for modulating communication signals in a quadrature amplitude modulation.

Thus preferably the data rates are increased by applying several measures like for instance said ODMA by orthogonal frequency division multiple access (OFDM) (and/or orthogonal time division multiple access (OTDMA)) and a quadrature amplitude modulation (QAM). Further an improved multiple-in/multiple-out (MIMO) antenna technology and an improved air interface (EUTRAN) are implemented. The so called e-NodeB base stations are connected in a simplified manner directly to the core net which is labeled as EPC (evolved packet core); the EPC is standardized already according to 3GPP. Thus, a LTE based 4G extension can be built up on an existing core net in principle.

Contemporary cellular radio networks known since many years are now meanwhile based on different technologies. The broadest coverage still is held by the global system for mobile communications according to the so called GSM standard. A communication user equipment in such cellular network can move freely and may be handed over to various cells of the GSM networks. Modern contemporary radio networks are based on a cellular code division multiple access CDMA as e.g. realized in the universal mobile telecommunication system UMTS. Networks implementing these standards are increasingly important for security applications like camera systems or the like.

Also the above mentioned LTE-like, LTE or LTE-advanced other technologies are known for use in a cellular radio network like TDMA based technologies like WCDMA, HSPA, EV-DO or the like 3G-(UMTS) technologies, CDMA-based technologies like IS-technologies or the like 2G, 3G technologies and LTE or WiMax based technologies and the like 4G-technologies. However, beyond the above examples in this application the use of LTE is not restricted beneath the broad definition outlined in the claims, but is of general kind also embracing future technologies, in particular as far as these use ODMA and/or QAM.

A communication user equipment in radio networks can be subject of being affected by a jamming transmitter. Jamming in this context generally is performed by an instrument preventing a communication user equipment from receiving signals from its base station. In use the jammer effectively disables cellular phones mostly by broad frequency interference with communication frequencies of the communication user equipment at high power level. Whereas some jammer applications are meant to be legal e.g. in places where phone calls are to be suppressed due to silence conditions. Other jammers are applied during misuse e.g. to interrupt security applications of communication user equipment or the like. Jammers are available for jamming GSM-and also UMTS-and LTE-frequencies. However, jamming detecting and jamming preventing solutions are known up to date basically only against GSM-jammers. In this regard, it should be recognized that primary aim of an anti-jamming solution is to undoubtedly detect a jamming attack; however, it is also desirable to prevent the same.

Accordingly anti-jamming solutions have been suggested for a GSM standard like in WO 2005/112321 or WO 2007/019814. Therein a broad band spectral density can be used to detect jamming.

Other lately developed solutions refer to the UMTS standard using a CDMA technology in particular wherein the situation is more complex. A communication user equipment (UE) and a number of base node stations (BNS) are the basic components of a CDMA based radio network. The radio network (RN) may work in the mode of either a frequency division duplex (FDD) mode or a mode of a time division duplex (TDD) mode. In UMTS a communication link in a serving cell coverage area is provided between the communication user equipment and a serving base node station BNS once a communication signal unit SU is correlated with a pseudonoise spread code SC in a serving cell coverage area CA of a serving base node station and transmitted as a pseudonoise chip CHI in a multiple shared communication frequency channel. Interferences of multiple base node stations and communication user equipments in the communication frequency channel are spectrally located between an upper frequency and a lower frequency of a communication frequency band. Consequently, a broad band "jamming like" interference in the multiple shared communication frequency channel cannot be considered as an extraordinary event but is part of the usual state of operation.

In WO 00/62437 a concept for improving jammer detection sensitivity in a CDMA based communication network is provided wherein spectral analysis data are used to identify jamming signals having power spectral density characteristics which are distinguishable from those of legitimate subscriber transmissions in the wireless system's frequency band.

In WO 2012/066052 A1 a method of detecting a jamming transmitter affecting a communication user equipment is described, wherein said communication user equipment and a number of base node stations (BNS) are components of a cellular code division multiple access (CDMA) based radio network. Therein a communication signal unit is correlated with a pseudonoise spread code in a serving cell coverage area of a serving base node station and transmitted as a pseudonoise chip in a multiple shared communication frequency channel spectrally located between an upper frequency and a lower frequency of a communication frequency band (FB I-XIX). Accordingly therein a set of cell selection criteria and power parameters in the communication link at a first earlier time and at a second later time are measured to detect jamming.

With the advent of the LTE-technology or the like so-called 4th generation of wireless cellular communication this issue of jamming and its detection will become important for this new technology as well. The instant application of subject matter is directed to communication technologies capable of supporting OFDM/OFDMA—generally ODMA—link based (uplink and downlink) systems such as systems according to the LTE standard or LTE-advanced standard or other 4th or further generation technologies of wireless telephony. In particular the LTE technology—both in FDD or TDD use—is characterized by measures to improve spectral efficiency; here measures like OFDM/OFDMA, MIMO (multiple in/multiple out) antennas, QAM (quadrature amplitude modulation) are to be mentioned primarily.

Due to the further technical nature of LTE it is particular easy to disturb an LTE-based module or device while the jammer is not recognized with the known jamming detection algorithms and methods for the earlier wireless technology generations, even if they are adopted to LTE.

The reason lies in the differences of technology:
- UMTS is a technology based on a code stack, that is all transport channels and logic channels (like BCH/CPICH) are disturbed within a 5 MHz band if that band is jammed; hence in any of these channels the disturbance is seen simultaneously;
- GSM is based on a frequency-re-use larger than one system; this means that frequencies that are used in one base station are not used in one of the surrounding base stations. The same is especially true for the broadcast channel BCH; it can be assumed that the BCH for different base stations is located on different frequencies;
- LTE is a system with frequency "re-use one", which means that all cells are allowed to use the same frequencies. Further in LTE the BCH is practically always located in the centre of the used band as is outlined in some examples of FIG. 2. Although this is a technological drawback from an inter-cell interference perspective this subject has been decided that way to allow easy registration based on blind detection and to afford unknown overall system bandwidth during synchronisation process.

Thus the proposed jamming detection method for LTE has to differ from the steps and measurements that need to be applied to GSM and UMTS. By now no jamming detection algorithms are known for LTE. In particular regarding specific measurements concerning the energy on LTE specific resource blocks or frequencies carrying e.g. the BCH (frequency carriers) there are no further publications available. According to LTE related standard document TS 36.214 only the following measurements are defined for EUTRA:
- as relates to a reference signal received power, a RSRP-measurement of the energy of the scheduled reference signals is possible;
- a EUTRA carrier total power across the entire LTE band is possible.
- a reference signal received quality (RSRQ), which is the ratio of the two above mentioned measurements is possible.

These measurements, however, are not sufficient to provide or hint to a reliable jamming detection.

This is where the invention comes in, the object of which is to provide an improved method of detecting a jamming transmitter affecting a communication user equipment wherein the communication user equipment and a number of base node stations are adapted to be components of a cellular radio network. The network is preferably based on ODMA, in particular OFDM, and QAM, like e.g. frequency division duplex or time division duplex mode cellular radio networks, in particular an LTE cellular radio network. In particular this shall relate to a 3G standard based on HSDPA and/or HSUPA and/or MIMO with bandwidths of up to 20 MHz; the latter today is referred to as LTE and/or a true 4G standard with bandwidths far beyond 40 MHz, in particular which today is referred to as LTE-advanced.

In particular it is an object of the invention to provide a method of detecting a jamming transmitter rather early, in particular prior to the communication user equipment falling back into the idle mode.

A further object of the invention is to provide an improved communication module, in particular communication user equipment, adapted to execute the method of detecting a jamming transmitter affecting the communication user equipment, in particular to detect the jamming situation already whilst the communication user equipment is in a start up mode. In particular it shall be discriminated between an out-of-service state or out-of-coverage state of the communication user equipment and a jamming warning situation.

It is still another object of the invention to provide such method and device with a more elaborated anti-jamming concept allowing also detection of a jamming transmitter on a broad frequency range. In particular it is an object of the invention to provide a more effective and/or more reliable method and device for detecting a jamming transmitter affecting a communication user equipment and while nevertheless being less dependent on sophisticated measurement of signal strength or power.

As regards the method, the object is achieved by the method of the invention as claimed in claim 1.

The invention starts from the consideration that the proposed jamming detection method for LTE has to differ from the steps and measurements that need to be applied to GSM and UMTS. According to the invention in the network the same communication band is common to the number of cells and to the number of communication user equipments (UE) on the respective communication channel of a cell. Thus, in particular the described LTE technology allows to fully disturb the communication by virtue of only narrowband jamming in particular on a broadcast channel (BCH), as communication user equipments (UEs) cannot enter the disturbed cell at all. This situation therefore leads to a need for a more elaborate method for jamming detection than already known.

It is therefore a recognition of the present invention to suggest a concept of a method for detection of a jammer which in particular only disturbs the BCH of an LTE band or only similar carriers of technologies with similar architecture. A jamming detection method and algorithm is presented for LTE, whereas it needs to be noted that the method presented is also applicable for BCH disturbance in LTE. In particular simple BCH measures and measurements are introduced to evaluate and recognize whether the BCH itself is jammed or not.

Starting from the above consideration with regard to a LTE like cellular radio network as mentioned in the introduction, the invention provides an improved method for detecting a jamming transmitter based on the peculiarities of said cellular radio network. Preferably but not necessarily said cellular radio network is characterized as an LTE like network when being adapted for coding communication signals in a link related to the communication user equipment (UE) by access means of an orthogonal division multiple access out of a group comprising, frequency division multiple access and/or time division multiple access and wherein the access means being adapted for modulating communication signals in a quadrature amplitude modulation.

According to the concept of the invention the steps are provided:
1. Decoding said cell, in particular successful reading control information of said cell; i.e. further according to a development, decoding the cell is provided by means of reading a control information. In particular, but not necessarily, the communication user equipment can be provided in a communication link to the cell and a communication indicator can be adapted to indicate that the communication user equipment has been linked to the cell;
2. Further, a first power parameter as a wideband power parameter of the cell is detected;
3. Further a second power parameter as a channel power parameter of the communication channel is detected, being representative for a part of the communication band, in particular wherein said part of the communication band is a communication channel;
4. A narrowband jamming transmitter is indicated in the case that decoding of the cell failed and in case of detection that at least one of the wideband power parameters is not above a first threshold and that the second power parameter is above a second threshold.

The steps have been numbered for referencing in the following. A sequential execution of the steps according to the numbering is one of several preferred developments of executing the method. Notwithstanding, the numbering does not define sequential execution of the steps according to the numbering.

In a simplified scheme the concept proposes a safe method to indicate a narrowband jamming transmitter once it is recognized that decoding of the cell failed and the channel power parameter either of the cell or the communication channel has increased considerably.

In particular, in case only the first parameter is above a first threshold a wideband jamming transmitter is preferably indicated. However, in case it is detected that both of the first and second power parameter are below a third threshold, an out-of-service can be indicated.

The first, second and third threshold can all or partly have the same value or each of the first, second and third threshold can have a different value. The advantages of the concept in particular comprise that the procedure is both capable to detect a wideband and a biased resp. narrowband jammer preferably (on BCH) in LTE. In a simplified mode it can be configured to only detect narrowband jammers. Further a comparingly simple BCH measurement is sufficient to detect the jammer. The concept provides a basis for several means to increase reliability of jamming detection.

The concept of the invention also leads to a device of claim 16. The device is adapted for a communication user equipment, in particular the device is communicatively connectable to an application layer, in particular to report a functioning state of the device to the application layer. The device is in particular configured to execute the method of detecting a jamming, affecting the communication user equipment.

According to the concept the detection device has
- a data storage means adapted for storing a setting of a communication indicator, indicating that the communication user equipment (UE) has been linked to the cell when the communication user equipment (UE) is in a communication link to the cell;
- a cell decoding unit (11) adapted for decoding the cell, in particular by means of reading a control information;
- a power measurement unit adapted for detecting a wideband power parameter of the cell, and/or
- a further power measurement unit adapted for detecting a channel power parameter of the communication channel, and
- a logic comparator adapted for comparing the read control information status to a cell camping status
- a power comparator adapted for comparing the wideband power parameter to a first threshold and the channel power parameter to a second threshold,
- a jamming indicator adapted for indicating a narrowband jammer.

The concept also leads to a system of claim 17 comprising the device and a communication user equipment (UE) adapted for communication with a component of a cellular radio network (RN), in particular an LTE and/or FDMA and/or TDMA based radio network (RN).

A base station (eBNS) of a cell and a number of communication user equipments (UE) assigned to the cell can be linked by an air interface (EUTRAN) for the communication on a respective communication channel in a communication band of predetermined frequency range. Thus, the same communication band is common to the number of cells and to the number of communication user equipments (UE) on the respective communication channel of a cell.

In particular, further preferably, the cellular radio network is being adapted for coding communication signals in a link related to the communication user equipment (UE) by means of an orthogonal division, in particular frequency and/or time division, multiple access and being adapted for modulating communication signals in a quadrature amplitude modulation.

The method and developed configurations thereof as outlined above may be implemented by digital circuits of any preferred kind, whereby the advantages associated with the digital circuits may be obtained. In particular one or more method steps or features of the method can be implemented by one or more means for functionally executing the method step. A single processor or other unit may fulfill the functions of several means recited in the claims—this in particular holds for a communication user equipment according to the concept of the invention. The concept also leads to a computer program product storable on a storage device and adapted for executing the method when executed on a device.

In the claims a power parameter is to be understood as any suitable parameter or quantity which is adapted to indicate a power level. E.g. generally the units of Power Spectral Density (PSD) is a function of power versus frequency and when integrated across a given bandwidth, the function represents the mean power in such a bandwidth—this holds generally for GSM and CDMA but also for CDMA and TDMA. However, a power parameter significant for a physical entity of power (like e.g. a power parameter for power per chip or a power parameter for a received signal power or wide band power) does not necessarily has to be identical with the physical entity itself. It is common technical understanding that a physical entity can be expressed by a variety of parameters and units depending of the technical usefulness and applicability. Thus, a power parameter being representative of a band, channel or other kind of carrier or a power parameter significant for a physical entity of power is to be understood in broad terms as any form of representation of the physical entity of power. Thus a power parameter in particular can be chosen to be a power or a Power Spectral Density (PSD) or the like quantity.

Also other parameters can be used, in particular specific parameters as suggested in the standard. E.g. when the mean power is normalized to or divided by a chip-rate it represents the mean energy per chip, which is specific for CDMA. This is the common practice of relating energy magnitudes in communication systems and can be used related to channels for both GSM and CDMA based technologies; a channel or chip related PSD is also referred to as a biased energy, whereas the total wide power at an antenna is referred to as unbiased power. It can be seen that if both energy magnitudes in the ratio are divided by time, the ratio is converted from an energy ratio to a power ratio, which is more useful from a measurement point of view. It follows that an energy value per chip of X dBm/3.84 MHz can be expressed as a mean power per chip of X dBm.

Similarly, a signal PSD of Y dBm/3.84 MHz can be expressed as a signal power of Y dBm. E.g. DPCH—Ec/Io is the ratio of the transmit energy per PN (pseudonoise) chip of the DPCH (dedicated physical channel) to the total transmit power spectral density at the e-Node B antenna connector. Ec/Io is the ratio of the average transmit energy per PN chip for different fields or physical channels to the total transmit power spectral density at the e-Node B antenna connector. In general terms for 3G and 2G e.g. the Ec (respectively RSCP)/Io (respectively RSSI—total receive power) is the received energy per chip divided by the power density in the band. 'Io' includes the power of specified cell as it indicates total received power. As a result, Ec/Io is deteriorated by increasing 'Io'.

These aspects of the invention and further developments thereof are further outlined in the dependent claims. Thereby the mentioned advantages of the proposed concept are even more improved.

As relates providing the communication user equipment in a communication link to the cell and setting a communication indicator, indicating that the communication user equipment has been linked to the cell (see above step 1.), the communication indicator can provide a simple, for instance, binary indication item that a communication user equipment has camped on a cell for instance by identification of the cell.

In a preferred development also a power parameter of the cell and/or a power parameter of a communication channel of the link can be stored in assignment to the communication indicator. Preferably a threshold, in particular formed as a noise threshold, and/or a power parameter is stored with the communication indicator. In particular an early measured power parameter can be compared with a later measured first and/or second power parameter and this approach can be used as a communication indicator.

Decoding the cell by means of reading control information gives a first hint to whether a jamming transmitter is affecting the communication user equipment. One or more of the aforementioned and below developed approaches can in particular be used to detect the jamming situation rather early, in particular already whilst the communication user equipment is in a start up mode.

Further as relates decoding the cell, decoding preferably is provided by means of reading control information. Whereas in general this relates to any kind of control information available for synchronization of a communication user equipment to the cell, in particular decoding the cell comprises reading a master information block (MIB) as defined in the LTE standard. In particular decoding the cell by means of control information comprises reading a master control information wherein a bandwidth information or the like cell related control information in a master information block (MIB) is read. In LTE most of the system information is scheduled as all other data information carried in LTE via transport channels except the MIB containing system bandwidth information and other important parameters.

In case of jamming in LTE, in particular wideband jamming or narrowband jamming of a broadcast channel, a communication user equipment is prevented from entering the cell. In particular the primary sync channel (PSS) and also secondary sync channel (SSS) are no more decodable. However, besides preventing communication user equipments from entering the cell one prevents also the communication user equipment in the cell from further receiving service, although the traffic channels are not directly disturbed. Disturbing the BCH and/or SCH channels prevents in particular from reading said master information block (MIB).

One of the parameters contained in the MIB is the CFICH size. The CFICH indicates which of the OFDM symbols are scheduling information and which are data symbols. A communication user equipment being scheduled also requires this information, as—depending on cell load and whether small or large packets are transported—the size of the CFICH can vary. Hence, by only disturbing the BCH and/or MIB in LTE prevents a communication user equipment from entering that cell and prevents the communication user equipment from mobility and prevents the communication user equipment from scheduling data transfer. Thus, in LTE it is sufficient to disturb selected frequencies like only a BCH carrier being located for all cells on a band on the same frequencies. As outlined further below such jamming method would also be transparent for so far used methods.

Further as relates detecting a first power parameter of the cell (see above step 2.), in particular, a communication band of a cell has a predetermined frequency range of above 20 MHz, in particular of above 40 MHz, in particular of above 100 MHz. Detecting in particular an unbiased total received wideband power of the cell, in particular at the air interface antenna of the communication user equipment, in particular a so called E-BCH power resp. RSSI (received signal strength indicator) a further indication is provided whether the communication user equipment is affected by a jammer.

Both kinds of communication channels are measurable with regard to measuring an absolute biased power of said communication channel. Examples are for instance a so called BCRP power (BCH carrier receive power) and/or a SCRP power (SCH synchronization receive power). Thus, detecting these or other kind of second power parameter of the communication channel can give a further hint to whether the communication user equipment is affected by a jammer.

Further as relates detecting a second power parameter of the communication channel (see above step 3.), it is understood in a preferred development the communication channel can be a broadcast channel (BCH) and/or a synchronization channel (SCH).

Thus, as relates indicating a jamming transmitter in the case that decoding of the cell failed and detection of wideband power parameter not above a first threshold and channel power parameters is above a second threshold (see above step 4.), the respective threshold can be provided by a fixed threshold, like for instance a noise threshold. Alternatively or additionally a threshold can be constituted by means of a power parameter stored previously, in particular with a communication indicator. Thus, it can be compared whether at least one of the detected power parameters exceed the stored early measured power parameter of the communication indicator.

In particular at least one of the first and/or second thresholds is defined by a deviation of the respective early measured power parameter by more than a predetermined tolerance-range.

In a particular preferred development, in the case decoding of the cell failed, said development provides decoding of another cell by means of reading another control information. Further in the case decoding of another cell fails the development provides for detecting a wideband power parameter of the cell by measuring power of the total communication band. In this development before indicating a jamming transmitter thus it is evaluated whether another cell is available in alternative to the formally camped cell.

In a further development apart from detecting an absolute power parameter of the cell, the method can comprise measuring a relative power parameter of the cell. In a particular preferred development the relative power parameter of the cell is a relation of a biased power of the communication channel and an unbiased total received wideband power of the cell. Examples are in particular a BCRP power (BCH carrier received power) or SCRP power (SCH carrier received power).

A biased power of the communication channel preferably is an integral power over the whole communication channel. Additionally or alternatively the biased power of the communication channel can be a time interval limited and/or instant power of the communication channel. Thus, several possibilities exist to provide a relative power parameter as a relation of an absolute power parameter and a biased power parameter to provide a further parameter to indicate a jamming transmitter.

In a particular development detecting a channel power parameter of the communication channel comprises detecting a power of at least one of the number of band carriers carrying the communication channel like for instance a broadcast channel or synchronization channel. Here, the communication band is constituted by a number of band carriers and a communication channel is carried by at least one of the number of band carriers.

Preferably in a first aspect of development the radiolink is measured for at least predetermined frequency range of one or more bands and/or channels and the power distribution is analyzed at least in the predetermined frequency range across a number of separate bands and/or channels. More particular measuring the radiolink provides an unbiased power distribution across available communication bands and/or channels of the, in particular entire, supported antenna range. This approach is rather easy to be implemented and can form the basis for a certain variance analysis of e.g. generally available bands and/or channels due to the separation of bands and/or channels. Preferably the item is a variance of separate bands and/or channels and analyzing the unbiased power distribution is in terms of a variance of separate bands and/or channels.

Preferably in a first aspect of development the radiolink is measured for at least predetermined frequency range of one or more bands and/or channels and the power distribution is analyzed at least in the predetermined frequency range inside of at least one band and/or channel. More particular measuring the radiolink provides a biased power distribution in a supported communication band and/or channel of the communication radiolink. This approach is particular reliable as also narrowband jammers can be detected. Preferably the item is a shape like a dip, a width, a steepness and the like item of distribution in the band and/or channel and analyzing the biased power distribution is in terms of a said shape and the like item of distribution in the band and/or channel. Also a characteristic feature and/or item can be additionally or alternatively a technology parameter like a statement of technology supported frequencies relative to a position of the communication user equipment.

Measuring the radiolink can be provided preferably for one or more additional technology relevant parameters, wherein the technology is selected from the group comprising:
GSM based technologies like GPRS, EDGE and the like 2G-technologies,
TDMA based technologies like WCDMA, HSPA, EV-DO or the like 3G-(UMTS) technologies,
CDMA based technologies like IS-technologies or the like 2G, 3G technologies,
LTE or WiMax based technologies and the like 4G-technologies.

In a particular preferred development the method is adapted to, but not restricted to, detect jamming at the location of static devices (i.e. devices non-moving for a sufficiently controllable period of time). Here the development recognized that in the LTE technology a power parameter should stay within certain tolerances; i.e. it is possible to define such tolerances for a static device. In a particular preferred example a power parameter of the BCH power received should stay within certain tolerances. The development generally comprises the steps of:
providing an early measured power parameter
providing the channel power parameter as a later measured power parameter
comparing the early measured power parameter and the later measured power parameter.

In a particular preferred development, in an analysis of the results of said steps, in particular in a static device, a narrowband jamming transmitter is indicated in the case that
the early measured power parameter and the later measured first and/or second power parameter deviate by more than a predetermined tolerance-range.

In a particular preferred development the method is adapted to, but not restricted to, detect jamming particularly based on the peculiar situation in LTE technology that the same communication band is common to a number of cells and to the number of communication user equipments (UE) on the respective communication channel of a cell. The development generally comprises the steps of:
detecting the wideband power parameter of said communication band for an early point of time and a later point of time and,
detecting the channel power parameter of said communication channel for an early point of time and a later point of time.

In a particular preferred development, in an analysis of the results of said steps—in particular in a peculiar situation in LTE technology that the same communication band is common to the number of cells and to the number of communication user equipments (UE) on the respective communication channel of a cell—a narrowband jamming transmitter is indicated in the case that
the wideband power parameter has decreased from the early point of time to the later point of time and
the channel power parameter has increased from the early point of time to the later point of time.

A particular preferred embodiment is further described with the detailed description of the drawing. For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the concept of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality. Whereas in the following the concept of the invention is exemplifying described by using the example of a CDMA based cellular radio network and terminology assigned thereto, it should nevertheless be understood that the general concept as claimed is not restricted to a specific technology but, also not explicitly mentioned in the example, embraces also other kinds of technologies like GSM, LTE or the like.

Figure 2:
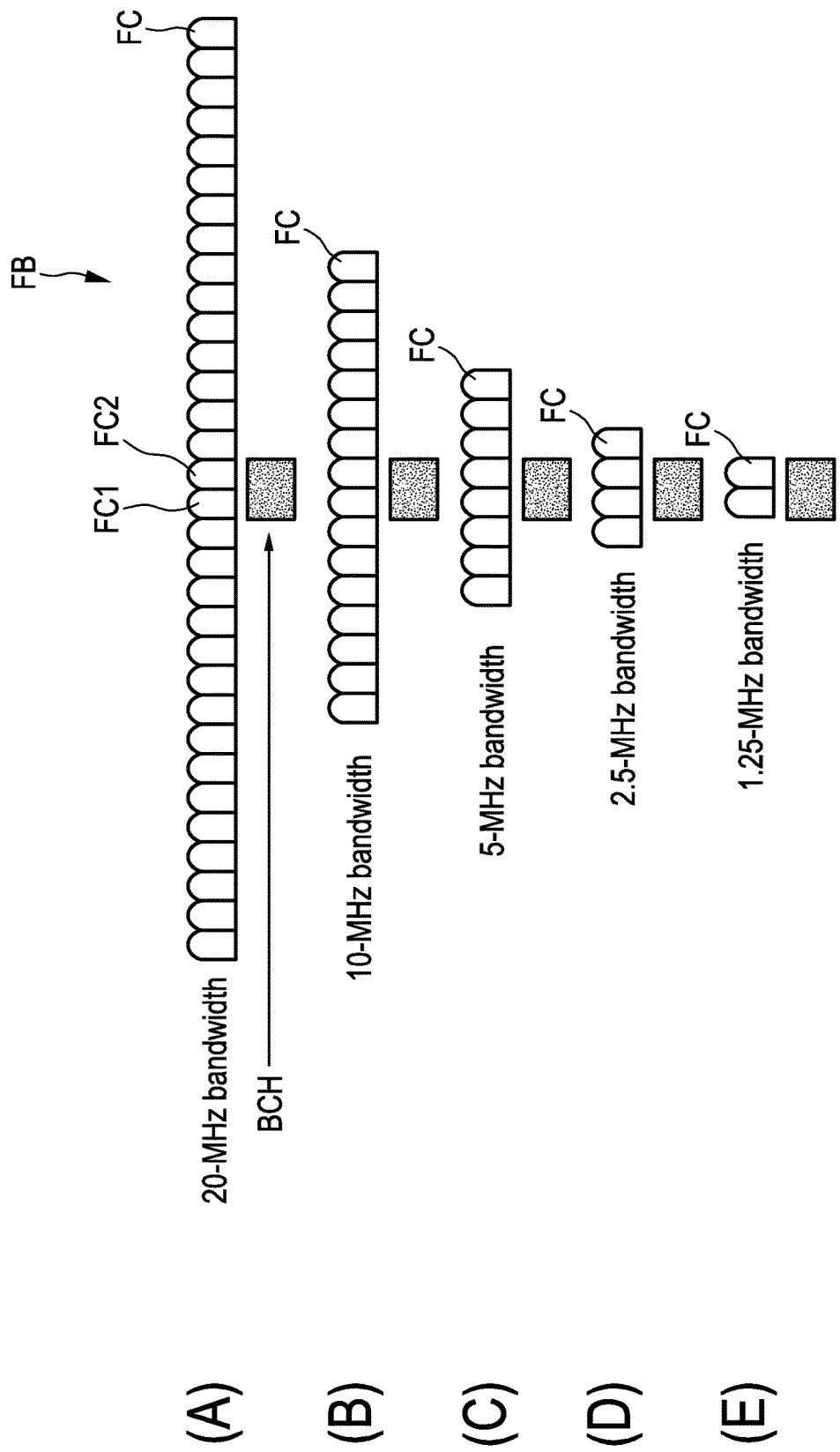
Figure 3:
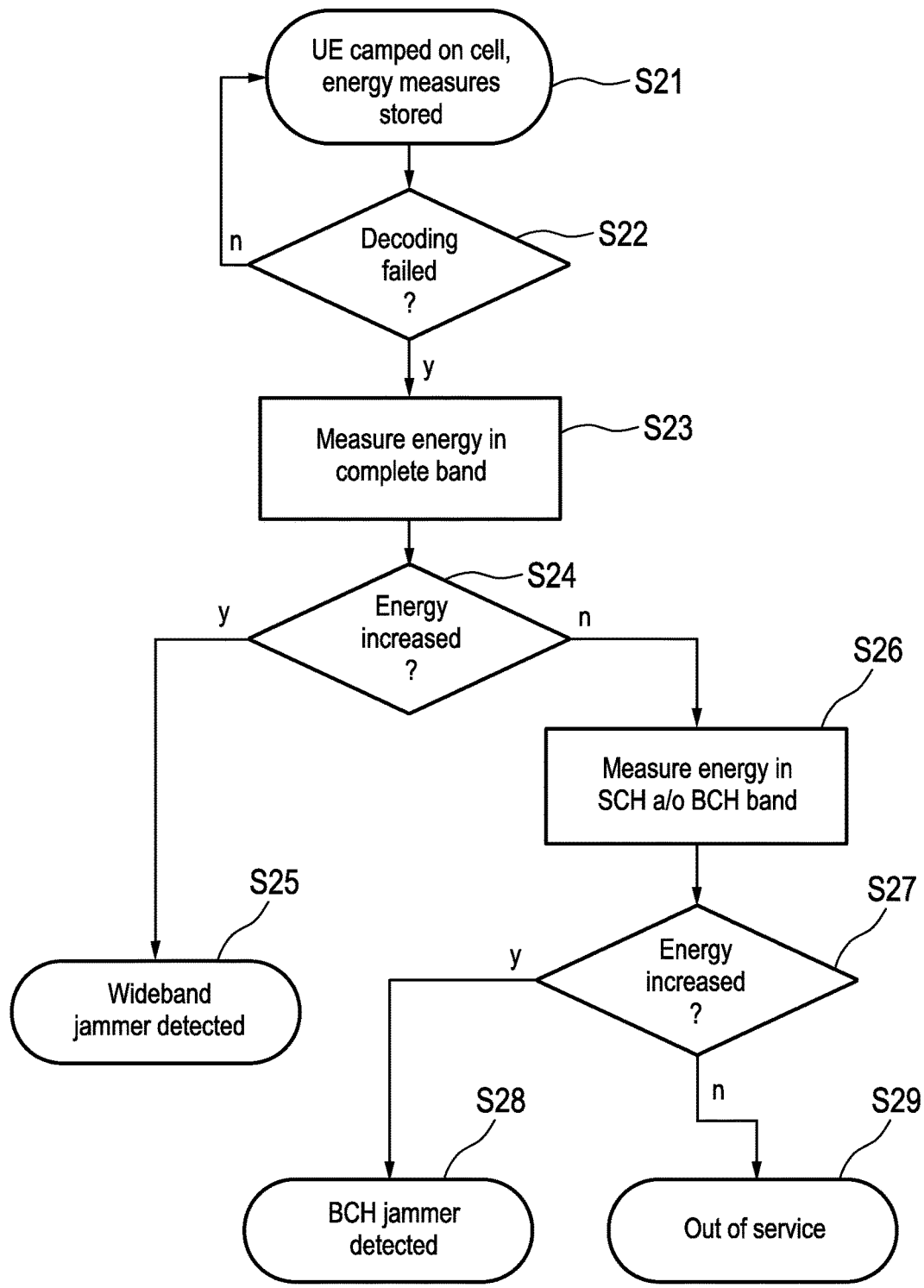
Figure 4:
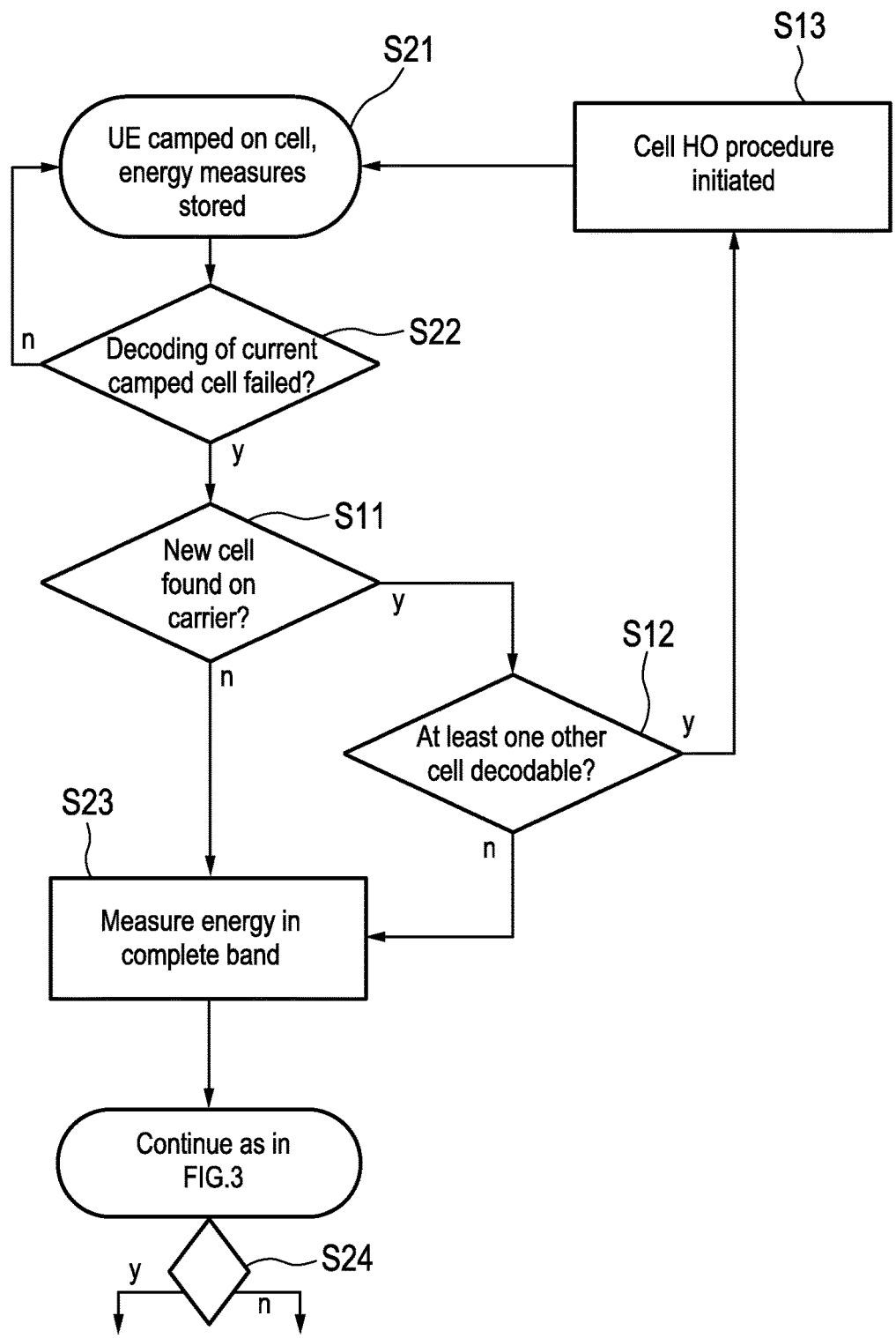
Figure 5:
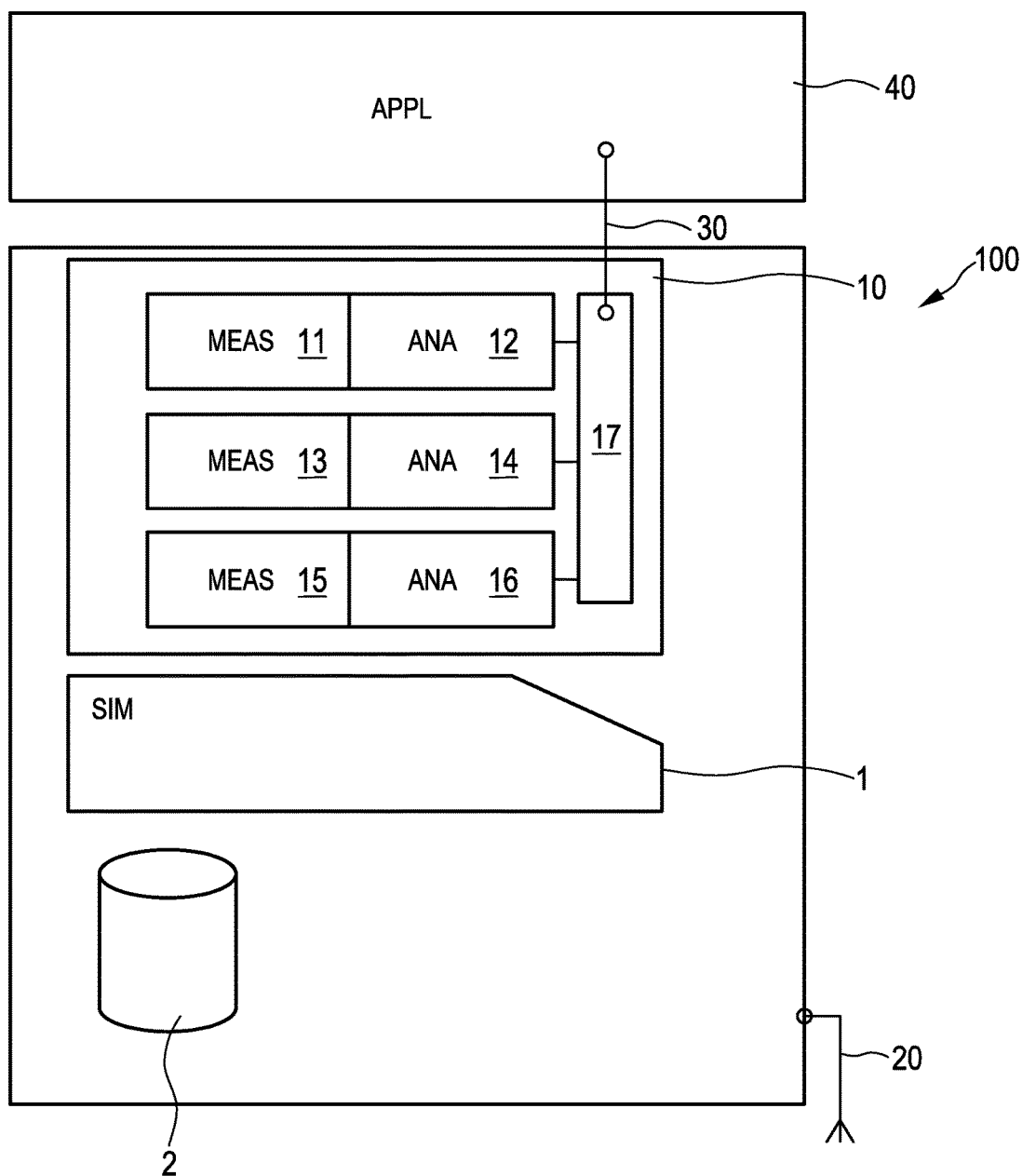

In the drawing:

FIG. 1: shows a principle sketch of a LTE or the like $4^{th}$ generation technology based cellular radio network;

FIG. 2: depicts some examples of a communication band constituted by a number of band carriers in dependence on the frequency range of the communication band;

FIG. 3: a flow chart of a preferred embodiment of a method of detecting a jamming transmitter wherein between a wideband jammer and a narrowband jammer can be discriminated in addition to identifying an out-of-service status;

FIG. 4: shows an supplement flow chart in addition to the flow chart of FIG. 3 wherein a further preferred embodiment of the method of detecting a jamming transmitter can be supplemented upon checking whether an instant cell or another cell is available before indicating a jamming transmitter;

FIG. 5: a scheme of a device for a communication user equipment, adapted to execute the method as depicted with FIG. 3 and FIG. 4.

FIG. 1 shows in principle a cellular LTE based radio network RN. The radio network RN allows for several transmitters—here referred to as a communication user equipment UE—to send information simultaneously over a single communication channel. This allows several communication user equipments UE to share a bandwidth of different frequencies.

The LTE based network can employ a frequency division duplex FDD or time division duplex TDD mode. The LTE based radio network RN provides a set of at least one base node station eBNS—usually referred to as eNodeB station—here e.g. the serving base node station 1 and the further base node station 2, which are within reach of the communication user equipment UE1. E.g. a communication link 1C in a serving cell #1 coverage area CA1 of the serving base node station 1 is provided between the communication user equipment UE1 and the assigned serving base node station serving base node station 1. As the communication user equipment UE1 is also in the cell coverage area CA2, base node station 2 and the serving base node station 1 form an active set of base node stations, which are both in reach of the communication user equipment UE1. In the present embodiment the serving base node station 1 has the strongest communication link 1C.

The communication link 1C is adapted for transmitting a signal comprising multiple communication signal units SU between the communication user equipment UE1 and the serving base node station 1.

In the instant embodiment, a jammer J affects the communication user equipment UE1 by interfering with the multiple shared communication frequency channel as located in a communication frequency band. Frequency bands FB around 800 MHz, 1800 MHz and 2600 MHz are known in the LTE standard. Each frequency band comprises several communication frequency channels; today each having a bandwidth of 20 MHz but also extendable to 40 MHz or more and thus largely increased as compared to the UMTS standard. A communication frequency of a synchronization channel and/or dedicated channel in the end is spectrally located between an upper frequency and a lower frequency of a communication frequency band, e.g. a frequency band FB I to XIX as it is basically known for the UMTS standard. The bands lie in the range of between 700 MHz to 2700 MHz; in the European Union e.g. a frequency band I at 2100 MHz is provided. The band provides a duplex distance for uplink and downlink channel of 190 MHz and provides a sequence of channels of 60 MHz width. Thus, each duplex channel has a 5 MHz width in a band. In LTE the number of duplex channels increases and each has a width of 10 or 20 MHz. The data rates in such kind of rather broad frequency channels in UMTS standard are meanwhile upgraded according to HSDPA or HSUPA. Longer term developments of UMTS to 4G-speed increase for downlink to of 100 Mbits/sec and 50 Mbits for uplink.

In the case the distance between serving base node station 1 and communication user equipment UE1 is diminished like e.g. the distance between serving base node station 1 and UE10 the cell selection criteria power parameters will increase, thus overall the signal quality will increase. However, in the case the distance between UE10 and serving base node station 1 is enlarged—e.g. by moving to UE20—the cell selection criteria power parameters of the serving base node station 1 will decrease but instead those of the base node station 2 will increase. Thus, upon such situation a soft-handover may occur between serving base node station 1 and base node station 2 when moving UE10 to UE20.

Distinct from those normal operation interferences in the communication frequency channels is the situation shown in FIG. 1 due to the presence of a jammer J. The presence results in a communication user equipment UE1 increased received staple power. The increase is due to the jamming power of jammer J. In the "out-of-service area" situation the unbiased parameters decrease as the biased parameters also decrease. In principle this situation can be used to detect a jamming transmitter affecting the communication user equipment UE1 when also an unbiased received wideband power within the bandwidth of the communication user equipment receiver at the communication user equipment UE1 antenna connector is measured.

However, this demands for comparison of power levels of different points of time; namely before and after the jamming situation. However, due to the timespan in between the different points of time the communication user equipment UE1 may have fallen back into the idle mode and thus loosing the communication link cannot be prevented anymore. Also in a start up mode no earlier reference is available. According to the concept of the invention this situation can be used to provide an effective concept of detecting a jamming transmitter affecting the communication user equipment UE1.

With reference to FIG. 2 several examples of a communication band FB according to an LTE standard are shown, wherein in example (A) the communication band FB has a 20 MHz bandwidth and consists of a number of frequency carriers FC with each frequency carrier having a 600 kHz frequency width (25 kHz spacing). The 20 MHz bandwidth of the communication band is shown relative to the position of the broadcast channel located in the center of the communication band FB as supported by two frequency carriers FC1, FC2. A corresponding situation holds for a 10 MHz bandwidth communication band FB in example (B), a 5 MHz bandwidth communication band FB in example (C), a 2.5 MHz bandwidth communication band FB in example (D) and a 1.25 MHz bandwidth communication band FB in example (E).

For instance, the bandwidth of the communication band, i. e. 20 MHz, 10 MHz, 5 MHz, 2.5 MHz or 1.25 MHz is an important control information for decoding the cell. Said bandwidth usually is submitted in the master information block MIB in a broadcast channel BCH or synchronization channel SCH.

Based on such band structure a method is suggested for detecting jamming, preferably in a communication module, capable of supporting OFDM/OFDMA downlink based system such as LTE standard. In case of BCH jamming in LTE UEs are prevented from entering said cell. The PSS (Primary Synch Channel) and also SSS (Secondary Synch Channel) are no more decodable.

However, besides preventing new users from entering the cell one prevents also the UEs in the cell from further receiving service, although their traffic channels are not directly disturbed.

Disturbing the BCH (and Synchronization Channels) prevents also from reading the MIB (Master Information Block). In LTE most of the system information are scheduled as all other data/information camped in LTE via transport channels except the MIB containing system bandwidth information and other important parameters. One of these parameters is the CFICH size. The CFICH indicates which of the OFDM Symbols are scheduling Information and which are data Symbols. Hence a UE being scheduled also requires this information, as depending on cell load and whether small or large packets are transported the size of the CFICH can vary. Hence by only disturbing the BCH in LTE one prevents UEs from entering that cell, one prevents UEs from mobility and one prevents UEs from scheduling data transfer. Hence, in LTE it is sufficient to disturb selected frequencies only (BCH) being located for all cells on a band on the same frequencies as outlined further below such a jamming method would also be transparent for so far used methods.

No jamming detection algorithms are known for LTE so far. Furthermore there are no BCH specific measurements concerning the energy on the resource blocks/frequencies carrying the BCH defined (TS 36.214). According to TS 36.214 the following measurements are defined for EUTRA:
Reference Signal Received Power (RSRP) measurement of the energy of the scheduled reference Signals
EUTRA Carrier RSSI total power across the entire LTE band
Reference Signal Received Quality (RSRQ), ratio of the above mentioned measurements.

Further with reference to FIG. 2, one possibility to disturb and/or to jam LTE without changing the total power (EU-TRA carrier RSSI) in a remarkable way is to disturb the resource blocks—labeled FC1, FC2—which carry the BCH only. The BCH is in this example always carried by six center resource blocks/carrier. A subcarrier spacing of 15 kHz is applied and LTE supports system bandwidth of up to 20 MHz (wherein 90% of the bandwidth is usable for traffic). As a consequence there are up to 1200 subcarriers. Hence a recognition that in the example said six of these carriers are disturbed when looking at the overall power (EUTRA carrier RSSI) it would simply not be remarked. EUTRA carrier RSSI measurement is an integration of the energy via all subcarriers. RSRP is only related to the reference signals being located on other carriers than the BCH, and hence also RSRQ would not be able to detect such a jamming situation.

An optimized algorithm based on different measurements or evaluating them in addition is preferred. A particular preferred example is as follows and comprises new measurements especially for the resource blocks carrying the BCH (Broadcast channel) according to the LTE standard. Among others these measurements comprise but are not limited to measuring a BCH-carrier received power (BCRP), measuring an E-BCH power, and measuring a BCRQ (BCCH Carrier Received Quality).

As relates the BCRP: the BCH-carrier received power (BCRP) is defined for a considered cell as the linear average over the power contributions (preferably in the units of Watt [W]) of the resource elements that carry the BCH related information within the considered measurement frequency bandwidth of six resource blocks.

As relates the E-BCH power this is more particularly related to the E-BCH carrier received signal strength indicator and comprises the total received wideband power observed by the UE from all sources including co-channel serving and non-serving cells, adjacent channel interference, thermal noise etc. within the bandwidth corresponding to the bandwidth of the resource blocks carrying the BCH (6 RBs).

As relates the BCRQ: a BCH signal received quality is the ratio of the two above defined measurements, which means the ratio of the BCH carrier received power and the E-BCH power.

It should be recognized generally that as the broadcast from all EUTRA cells is located on the same subcarriers the e.g. ½0 forward error coding is the only gain that is available to decode said channel from serving and neighboring cells. In areas with a high base station density this may face high burden for the UE and the system. This means that due to high intercell interference the BCH may rather be late decodable for a UE depending on its receiver quality. Without decoding that channel no handover (HO) mobility or cell re-selection is possible. In HO scenarios the earlier the neighbour BCH is decoded the earlier a HO can be made. Depending on the moving speed this provides a certain time which is available for the HO. Only in TS36.133 B2.3 and corresponding intrafrequency and inter-frequency EUTRA requirements a side condition on the synchronization channel SCH_lo and SCH_RP/lo are defined. SCH is transmitted in the last OFDM Symbol of the first and sixth subframe of the frame on the RBs containing the BCH. SCH detection is a pre-known sequence and hence can be realized by a matched filter. BCH decoding is a requirement on the UE decoder itself. It may be the case that said measurements for the BCH may be defined in a higher LTE release anyway for defining HO scenari-os/requirements in dependence of BCH disturbance/pollution. However, jamming detection shall be based on BCH measurement and disturbance preferably.

Nevertheless jamming detection would also be possible by observing corresponding measures for a jammer on SCH;

in particular a jamming would also be possible e.g. by disturbing SCH in said above mentioned six inner resource blocks.

For the measurements on BCH a general measurement could be made besides the jamming detection, as such a measurement may also be used/defined to specify an improved handover performance; in particular in the case that the parameter SCH_RP/IO is not sufficient. The reference signal exists only in one specific OFDM symbol and can be mapped on various resource blocks. Hence the direct disturbance here is less likely and whether disturbed by other signals. I.e. users in the neighboring cells would always be load dependent.

Similar in an LTE embodiment an LTE-UE shall be considered to be jammed if it cannot decode the BCH although the energy on the subcarriers containing the information is sufficiently high.

For definition of a noise floor one can proceed as follows: in an UMTS embodiment, a jammer affects the communication user equipment UE1 by interfering with the multiple shared communication frequency channel as located in a communication frequency band. Frequency bands FB I to XIX are known in the UMTS standard, each having a bandwidth of approximately 60 MHz. Each frequency band comprises several communication frequency channels, each having a bandwidth of 5 MHz. For each frequency channel, therefore the noise floor of approximately −110 dBm can be defined based on a relative noise floor of −174 dBm/Hz. With this noise floor of −174 dBm/Hz integrated via the bandwidth of 5 MHz (66 dB) one can calculate −174 dBm/Hz*5 MHz=−174 dBm+66 dB~110 dBm.

Accordingly in LTE a signal being 1/20 forward error coded should be extractable from noise floor, (−126 dBM). Considering a noise floor of −174 dBm/Hz and a bandwidth of 90 kHz this leads to −125 dBm, desensitized by 5 dB noise in the receiver and considering for a QPSK Signal of 78×1024 (−1/20 error coded) an SIR of −6 dB. Thus as noise floor −124 dBM shall be considered. Hence giving a signal which is more than 10 dB above that level and no other LTE cell is decodable the interfering energy is not coming from other LTE cells.

1. Thus having multiple cells not being decodable each <=126 dBM it is rather unlikely that they all could contribute to an aggregated interference being 10 dB above decodable level.
2. Besides the LTE cells, having their BCH emission on that carrier, there should be another interfering source; hence jamming is present if a communication was previously made on that cell or the BCH was formerly decoded.

It is preferred to distinguish the general jamming attempt from the BCH disturbance only.

This, in particular, implies:

If the BCH is only jammed, the jamming can only be seen in the newly defined measurements for the BCH resource blocks and their respective bandwidth. This is because the other LTE measurements will not even recognize that change depending on the overall bandwidth of the system as has been depicted in FIG. 1.

If the BCH carriers are disturbed only the energy on the remaining subcarriers will go down as then the UEs cannot decode anymore the relevant information for downlink (DL) and uplink (UL) scheduling being transmitted in the entire band but not decodable without the CFICH size length and bandwidth retrieved from the BCH. Hence, this would even mask the heavy increase of the energy on the BCH resource blocks as the received energy on the other resource blocks would rather go down.

A corresponding method and/or definition can be applied for SCH (Synchronization Channel) according to the basic concept: no more detectable and/or no more identifiable SCH although the energy in the band has increased.

On the other hand, if the entire LTE band is jammed, the energy will increase across the entire band. If the interfering energy is distributed across the entire band the UE will also remark that EUTRAN RSSI has increased. As compared to the previously mentioned and that the SCH/BCH is no more detectable and/or identifiable, hence here jamming detection can be detected on the EUTRAN carrier RSSI increase.

As an opposite definition: if a SCH is no more detectable and/or no more identifiable and also power is decreased this is an out-of-service situation for leaving LTE coverage area, which may especially be at the beginning more important. The jamming detection could check as further side condition/differentiator.

These examples will become particular clear with regard to the general procedure as shown in FIG. 3. The basic method—provided that the communication module was at an earlier point in time (t0) able to communicate within the LTE network—basically comprises the following steps:

Step 1 (corresponding to steps S21 and S22 in FIG. 3): If decoding of the previously used network cell is not possible especially concerning control information Step 2 (corresponding to step S23 in FIG. 3): Measure energy in the complete band If energy in the whole band has not increased as compared to a point of time t0?

Step 2a (corresponding to step S24 in FIG. 3)/Result: yes

Step 3 (corresponding to step S26 in FIG. 3): Measure energy in the bands carrying the BCH or the like synchronization sequences Step 3a: If energy of the BCH carrier has increased compared to t0?

Result (a) (corresponding to step S28 in FIG. 3): Jamming

Result (b) (corresponding to step S29 in FIG. 3): Out of service (in particular if total energy and BCH carrier energy has decreased)

Step 2b (corresponding to step S25 in FIG. 3)/Result: no—conclusion: presence of a wideband jammer Decoding can fail due to at least one of the following issues:

decoding of control information of SCH decoding of control information such as CFICH in the BCH or PDCCH information in the 1-3 OFDM failed.

Thus according to the inventive concept the instant embodiment requires as basic procedure the establishment of following measurements:

1. Total received wideband power (Step 2). In Step 2 the measuring of the complete band refers to the bandwidth named for the system information in particular in the BCH or a subband constellation being suitable to perform an estimate for the entire bandwidth.
2. BCH Carrier received power (Step 3) or of any other suitable time interval being representative of the power in the complete BCH band or in a specific time instance such as SCH Optionally the following measurement/calculation is helpful for the inventive procedure:

3. BCH Signal received quality—this is the ratio of power measured in Step 1 and Step 2, or instead of Step 1 to any other suitable reference.

Thus the LTE-UE shall be considered to be jammed if it cannot decode the cell (e.g. by SCH (combined from PSCH and SSCH, BCH, etc.), but in parallel the energy on the subcarriers containing the information is sufficiently high. This latter information is derived at least from the measurements of Step 1 and Step 2. In particular a jamming is identified in case the signal being ½₀ forward error coded is extractable from noise floor, in particular when an energy of −126 dBm can be detected. Considering a noise floor of −174 dBm/Hz and a bandwidth of 90 kHz this leads to ~−125 dBm as threshold indicating a theoretical detection limit, which may vary slightly in case of real implementations considering tolerances and required filters. However, below this threshold no decoding is possible, even known sequences such as SCH_RP being part of the BCH are only detectable down to −128 to 123.5 dBm depending on the used LTE band (Reference: TS 25.133 Annex B).

Measurements are performed in the UE; the measurement of Step 2 is not described in the standard currently. Only in 36.133 the PSCH Ec/Io is defined for detection of a new cell, that is primary synchronization code is detected only with this signal strength.

Thus, as shown in detailed terms in FIG. 3, in Step S21 a communication indicator is set providing an indication that the communication user equipment has camped on a cell; in this particular embodiment also a energy measurement is performed to provide a power parameter for the point in time t0 to be stored for instance as a first power parameter of the cell, this first power parameter being referred by terms wideband power parameter in claims and/or a second power parameter of the communication channel, this second power parameter being referred as channel power parameter in claims. In Step S22 decoding of a cell is attempted, in particular by means of reading a control information or identifying the cell or reading a synchronization channel, i. e. performing synchronization steps or the like. If decoding is successful, the sequence of method steps continues along the NO-path for setting a communication indicator of Step S21.

Along the YES-path, thus indeed decoding failed in Step S22; then in Step S23 an energy measurement is performed to provide a first power parameter of the cell. In this particular embodiment power of the complete band like for instance a 20 MHz bandwidth communication band FB as depicted in example (A) of FIG. 2.

In Step S24 a comparison is made between the energy or power measured in Step S23 and the energy or power stored in Step S21; namely here by comparing the first power parameter of the cell with a stored first power parameter of Steps S23 and S21 respectively. In the case of an energy increase then along the YES-path in Step S25 it already can be concluded—on basis of the results given in Steps S22 and S24—that a jamming transmitter is disturbing the communication user equipment. Namely, as decoding of the cell failed and detection of the first power parameter of the cell results in that said first power parameter has increased, the conclusion can be drawn that a wideband jammer is affecting the whole bandwidth of communication band FB. This particular wideband jamming situation will be very likely to occur with impact of wide-bandwidth-jammers.

Additionally, with particular effect according to the LTE technology nevertheless a narrowband jammer already is effective to influence severely the communication link of a communication user equipment to an eNodeB base node station eBNS. Namely in the case that the result of Step S24 is negative, i.e. in the case that the total unbiased wideband power in the communication band FB has not increased, then along the NO-path in Step S26 a further measurement of a biased energy in the communication channel—for instance a broadcast channel BCH or a synchronization channel SCH—is made. The measurement can be a measurement of absolute power or of relative power like for instance an Ec/Io value or the like. This kind of biased energy measurement is performed for the frequency carriers like for instance those labeled FC1 and FC2 in FIG. 2, supporting a communication channel, in particular BCH and/or SCH.

If in Step S27 the result is positive, namely in that the energy has increased then along the YES-path in Step S28 a conclusion can be drawn that a narrowband jammer is affecting the communication user equipment in a broadcast channel BCH and/or synchronization channel SCH respectively. Increased energy can be assumed in Step S27 when the comparison of a second power parameter of the communication channel with regard to a stored second power parameter of the communication channel of Step S21 shows that the second power parameter of the communication channel has increased.

In the case the result of Step S27 is negative, then along the NO-path the alternative conclusion can be drawn that the communication user equipment is out-of-service as indicated in Step S29. Thus, whereas a narrowband jammer indication is stringent upon failed decoding of the cell and increased biased energy in the communication channel also in the alternative upon failed decoding of the cell and decreased energy as compared to Step S21 is stringent for concluding an out-of-service situation in Step S29.

It should be clear that the comparison Steps for a first or second power parameter labeled S24 and S27 can also be executed with regard to a stored or stated threshold value which for instance can be established by a noise value or a noise floor or the like.

Further developed embodiments are described in the following:

1. In a first developed embodiment the possibility of other cells being detectable is outlined for handling within FIG. 4. For example with a given noise floor it is considered a signal which is in particular 10 dB above the noise floor level in dependence of the number of other decodable intrafrequency cells:
   If no other LTE cell is decodable (corresponding to step S12 in FIG. 4) the interfering energy is not coming from other LTE cells
   Normal operation as described above in FIG. 3 is executed (corresponding to step S24 in FIG. 3)
   With at least one other available cells (corresponding to step S13 in FIG. 4):
     When the available cells are not decodable each although at least one has a suitable signal strength
       A BCH jammer is assumed (depending on the following steps like described above in FIG. 3)
     When at least one available cell is decodable (corresponding to step S22 and following NO-path "n" in FIG. 4)
       No jamming is detected; so the standard's defined cell handover procedures are initiated, assuming that a handover is triggered by the network.
2. In a second developed embodiment the possibility of other technologies being detectable is outlined for handling with according to the following. In addition this will use the above indicated method of FIG. 3 being based on the existing measurements and combined in the appropriate way for jamming detection. When—as shown in FIG. 3—it has been detected that jamming is likely for LTE, irrespective if it is a wideband or BCH jammer, instead or additionally to a jamming detection warning the UE can try to access other technologies provided it is a Multi-RAT UE or other frequency bands it supports (e.g. other supported LTE bands). If no such bands are available it is more likely that jamming is available.

It is not necessarily recommended to change to one of these networks, in particular not insecure 2G networks which allow an IMSI catcher to compromise UEs security. It is not unlikely that the LTE jammer has exactly that goal.

Generally speaking the measures to be taken by the device after a jamming attempt is detected, varies from device to device and needs to be embedded into a general security concept. If e.g. the RSRQ (Reference signal received quality) or RSRP (Reference signal received power) of a cell can no more be detected and the EUTRA carrier RSSI has increased compared to the previous situation where the reference signal was still detectable, the UE is in a jamming situation.

3. In a third developed embodiment the possibility of extraordinary mobility being detectable is outlined for handling with according to the following.

The procedure as outlined in FIG. 3 can in particular be simplified for static and/or non-moving devices like in e-meters etc. For such devices an advantage of the LTE architecture compared to UMTS can be used. In UMTS the received energy varies with the load of the cell. The load of the cell alone therefore does not give a hint at all. In LTE the BCH has its own resource subcarrier blocks, hence for a static device the BCH power received should normally not vary at all within certain tolerances of e.g. +/−5-10 dB, in particular not due to the cell load. If therefore a static device is active from time to time it just performs a power scan across the six inner BCH carrying resource blocks and if the energy stays constant within a predetermined tolerance, everything is fine, that is no jammer is active.

In the case of a static device the steps are quite similar as the basic procedure outlined with FIG. 3. It is possible to trigger the jamming detection procedure based on an increase in the BCH power, as follows by comprising the steps of:

Making a first power scan across e.g. the six inner BCH carrying resource blocks Storing the power value as a BCH-power$_{t1}$ at an early point of time t1

After a predetermined time regularly executing another power scan across the e.g. six inner BCH carrying resource blocks Comparing the power value BCH-power$_{t2}$ at a later point of time t2 to the BCH-power$_{t1}$ at said early point of time t1 if this BCH-power$_{t2}$ is equal to BCH-power$_{t1}$, within a predetermined tolerance, no jamming is detected, otherwise (if this BCH-power$_{t2}$ is not equal to BCH-power$_{t1}$ within a predetermined tolerance) execute next steps of:

Making the device trying to decode the BCH:

if decoding is successful, no jamming is detected otherwise (if decoding is not successful) a jamming situation is detected and can be reported to attached devices To perform these steps for a static device requires basically the same steps as described above with FIG. 3 and/or FIG. 4; however here a different succession and trigger can be provided. Eventually the decision if jamming is detected or not is made with a higher reliability.

4. In a fourth developed embodiment the possibility of total energy reduced is outlined for handling with according to the following.

It is checked if the energy on other carriers than BCH gets lower. If a mobile device has an overall decrease of the wideband energy but the energy on the BCH increases, this is a strong indication that—provided BCH cannot be decoded—a BCH jamming is detected. Therefore this leads to a higher reliability compared to an unchanged wideband energy.

This is in FIG. 4 generally depicted as an extension of the embodiment shown in FIG. 3. Therein for similar, corresponding or identical steps or steps of similar corresponding or identical function the same reference marks have been used for simplicity. Basically, in advance of the steps described with FIG. 3 the following steps can be performed.

Before measuring of energy in the complete band in step S23 of FIG. 3 according to the flowchart of FIG. 4—as follow up of Step S22, in Step S11—it can be checked whether an alternative cell can be found on the frequency carrier FC or another carrier in the communication band FB once decoding of a current camped cell failed. Follow up of Step S11 along the YES-path this can result in checking in Step S12 whether upon identification of another cell the decoding of said another cell or a further alternative cell is possible. Thus, Step S12 along the NO-path has the same outcome as Steps S22 along the YES-path, namely in that the decoding of the at least one another cell or a further alternative cell failed. However, if decoding of said another cell is possible then along the YES-path in Step S13 a cell handover HO is initiated and will be followed up by Step S21 again, wherein the communication user equipment is camped on that said another cell. By measuring energies of the cell—namely a first power parameter of the cell and/or a second power parameter of the communication channel i. e. of the frequency carriers FC1, FC2 e.g. of the broadcast and/or synchronization channel BCH, SCH—these energy values can be stored as outlined above.

The loop of Steps S21, S22, S11, S12 and S13 can be repeated as long as in Step S11 further frequency carriers FC of a communication band FB are found. However, in the case decoding of a current camped cell failed in Step S22 or decoding of at least one another cell failed in Step S12, then this is followed up by measuring energy in the complete band of said cell as depicted in Step S23. The advantage of this procedure is that a time-consuming and also power-consuming energy measurement is executed only in the case that clearly no cell decoding is possible; i.e. the situation has become stringent that either an out-of-service situation or a jamming-situation has to be assumed.

The process as generally depicted in FIG. 3 and FIG. 4 or relevant parts or certain items of that process as depicted in the foregoing embodiments and examples as described maybe activated or deactivated depending on the situation or layout of the device or module or communication user equipment. Generally the concept can be implemented with a method of combining the steps of decoding a cell and detecting a first and second power parameter followed by indicating a jamming transmitter dependent on the outcome of the decoding and detecting step. Also further the concept can be implemented by a device supporting said functionality, a computer program for executing such functionality, an internal or external application controlling and triggering such method, a service center providing support for such a method, and/or any instance in or connected to the devices supporting the method. A respective exemplifying device thus is shown as a scheme in FIG. 5, wherein the modules of the device are shown schematically exemplifying separated, however, can be implemented together in one unit or also can be further divided or separated depending on the demands of the instant periphery of the device. Also the device is only an example for the hardware or software outlined above.

The communication user equipment 100 comprises a module 10 for mobile communication with a cellular radio network RN based on the LTE technology via an air interface, namely by means of an antenna 20 connected to a receiver. The receiver and also a power source for powering the communication user equipment is not shown in detail. The communication user equipment is provided with a SIM card 1 for authentication in the radio network RN and storage means 2. Further the communication user equipment 100 has an interface connection 30 between the module and an application 40. On the interface connection 30 commands—in particular AT-commands—can be transmitted for signaling between the module 10 and the application 40. The application 40 can be realized by means of a software or hardware layer, in particular by any kind device for connection to the cellular network by the module 10. For instance the application 40 can be formed by some kind of a sensor or a supervision device or metering or other apparatus.

In particular, the interface connection 30 can be used for transmitting a jamming warning and/or jamming detection indication and/or out-of-service indication to an application 40 once the module 10 has detected a jamming transmitter by means of the method described above. The module 10 thus is adapted for executing one or more method steps according to the embodiment shown in FIG. 3 and FIG. 4. In particular, the module provides a cell decoding unit 11 and a decoding analysis unit 12. Further the module provides a power measuring unit 13 for measuring a first power parameter of the cell and a power analysis unit 14 for analyzing the measuring of a first power parameter. Further, the module provides for a further power measuring unit 15 for measuring a second power parameter of the communication channel and a further power analysis unit 16. Also, the module provides a logic comparator 17 wherein the output of the analyzing unit 12, 14, 16 are combinable such that one of the decisions outlined with regard to steps S25, S28 and S29 can be taken to be reported to an application layer 40 by interface connection 30. Thus, so to say: measuring and analyzing units 11, 12 are adapted to perform step S22; measuring and analyzing units 13, 14 are adapted to perform steps S23 and S24; measuring and analyzing units 15, 16 are adapted to perform the steps of S26 and S27. In a further extension the measuring and analyzing units 11, 12 are adapted to perform the steps S11, S12, S13.

Storage of values outputted in step S21 is possible in storage means 2, for instance the communication indicator and/or energy values can be stored in storage means 2.

Generally it should be noted that a measuring unit 11, 13, 15 is adapted for measuring a decoding situation and/or a power level in a radiolink or upon trying to establish a radiolink via the antenna 20 and a corresponding receiver sensory for a power level in the radiolink at least at the predetermined frequency range, namely in particular in at least the band and/or channel as found during a cell search. An analyzing unit 12, 14, 16 provides for a comparator measure for determining whether one value is above another value, for instance whether a power level measured is above a threshold power level to establish a communication link or whether a power level measured is above a power level stored from a former communication link. A respective former power level or threshold level can for instance be stored in the storage means 2 or can be submitted to the module 10. A respective threshold level can be stored according to a setting or other received network frame.

REFERENCE SIGNS

100 communication user equipment
2 data storage means
10 module
20 antenna
30 interface connection
40 application
11 cell decoding unit
12 decoding analysis unit
13 power measurement unit
14 power analysis unit
15 further power measurement unit
16 second power analysis unit
17 logic comparator
RN cellular radio network
LTE Long Term Evolution
BS Base Station
BCH Broadcast Channel
CPICH Common Pilot Channel
UE Communication User Equipment, in particular Module or Mobile
PSC Primary Synch Channel
SSC Secondary Synch Channel
SCH Synchronization Channel
MIB Master Information Block
CFICH Control format indicator channel
OFDM Orthogonal Frequency Division Multiplexing
EUTRAN LTE Radio Network (->evolved UMTS Terrestrial Radio Access Network)
RSSI Received Signal Strength Indicator
RSRP Reference signal received power
RSRQ Reference signal received quality
BCRP BCH Carrier Received Power
BCRQ BCH Carrier Received Quality
HO Handover
BW Bandwidth

The invention claimed is:

1. Method of detecting a jamming transmitter, affecting a communication user equipment, wherein
said communication user equipment is adapted for communication with a component of a cellular radio network in a number of cells, and wherein
a base station of a cell and a number of communication user equipments assigned to a cell can be linked by an air interface for the communication on a respective communication channel in a communication band of predetermined frequency range, wherein
the communication band is common to at least one of the number of cells and to the number of communication user equipments on the respective communication channel of a cell, said method comprising the steps of:
decoding said cell, by successfully reading control information of said cell,
detecting a wideband power parameter being representative of said communication band, and
detecting a channel power parameter being representative for a part of the communication band, wherein said part of the communication band is a communication channel, and wherein
a narrowband jamming transmitter is indicated when
decoding of said cell failed,
detecting that the wideband power parameter is not above a first threshold, and detecting that the channel power parameter is above a second threshold.

2. Method according to claim 1 wherein the first and/or second threshold is formed as one of a group comprising:
a noise threshold, and
a power parameter stored with a communication indicator, wherein an early measured power parameter to be compared with a later measured power parameter.

3. Method according to claim 1, wherein a wideband jamming transmitter is indicated when
decoding of said cell failed; and
detecting that the wideband power parameter is above the first threshold.

4. Method according to claim 1 wherein an out-of-service is indicated when
decoding of said cell failed and
detecting both of the wideband power parameter and channel power parameter are below a third threshold.

5. Method according to claim 1 wherein
when decoding of said cell failed, decoding of another cell, by means of reading another control information; and
when decoding of said another cell failed, detecting a wideband power parameter of said cell by measuring a power of the total communication band.

6. Method according to claim 1 wherein
providing an early measured power parameter
providing channel power parameter as a later measured power parameter
comparing the early measured power parameter and the later measured power parameter, wherein
a narrowband jamming transmitter is indicated when the early measured power parameter and the later measured power parameter deviate by more than a predetermined tolerance-range.

7. Method according to claim 1 wherein
detecting the wideband power parameter of said communication band for an early point of time and a later point of time and,
detecting the channel power parameter of said communication channel for an early point of time and a later point of time, wherein
a narrowband jamming transmitter is indicated when:
the wideband power parameter has decreased from the early point of time to the later point of time, and
the channel power parameter has increased from the early point of time to the later point of time.

8. Method according to claim 1 wherein said cellular radio network is adapted for coding communication signals in a link related to the communication user equipment, by access means of an orthogonal division multiple access out of a group comprising frequency division multiple access, and time division multiple access and wherein the access means being adapted for modulating communication signals in a quadrature amplitude modulation.

9. Method according to claim 1 wherein said communication channel is provided in a communication channel at a constant communication channel frequency range position wherein the communication channel frequency range forms a small fraction of the communication band frequency range.

10. Method according to claim 1 wherein detecting a power parameter of the cell comprises detecting an absolute power parameter of the cell, wherein the absolute power parameter of the cell is an unbiased total received wide band power of the cell at the air interface antenna of the communication user equipment.

11. Method according to claim 1 wherein the communication channel comprises a broadcast channel and/or a synchronization channel and the absolute power parameter of the cell is a biased power of the communication channel.

12. Method according to claim 1 wherein the communication band is constituted by a number of band carriers and the communication channel, the communication band being carried by at least one of the number of band carriers, wherein detecting a channel power parameter of the communication channel comprises detecting a power of the least one of the number of band carriers carrying the communication channel.

13. Method according to claim 11 wherein
the biased power of the communication channel is an integral power over the whole communication channel and/or
the biased power of the communication channel is a time interval limited and/or instant power over the whole communication channel.

14. Method according to claim 1 wherein detecting a power parameter of the cell comprises detecting a relative power parameter of the cell, wherein the relative power parameter of the cell is a relation of a biased power of the communication channel and an unbiased total received wide band power of the cell.

15. Detection device for a communication user equipment, configured to execute the method of detecting a jamming, affecting the communication user equipment as claimed in claim 1, wherein the detection device has
a data storage means adapted for storing a setting of a communication indicator, indicating that the communication user equipment has been linked to the cell when the communication user equipment is in a communication link to the cell;
a cell decoding unit adapted for decoding the cell by means of reading a control information status;
a power measurement unit adapted for detecting a wideband power parameter of the cell, and
a power measurement unit adapted for detecting a channel power parameter of the communication channel, and
a logic comparator adapted for comparing the read control information status to a cell camping status
a power comparator adapted for comparing the wideband power parameter to a first threshold and the channel power parameter to a second threshold,
a jamming indicator adapted for indicating a narrowband jammer.

16. A system comprising the device of claim 15 and a communication user equipment adapted for communication with a component of a cellular radio network.

17. Method according to claim 2, wherein at least one of the first and/or second thresholds is defined by a deviation of the respective early measured power parameter by more than a predetermined tolerance-range.

* * * * *